UNITED STATES PATENT OFFICE.

ERNST BECHTEL, OF HANAU, GERMANY, ASSIGNOR TO HANAUER KUNSTSEIDEFABRIK ACTIENGESELLSCHAFT, OF GROSS-AUHEIM, NEAR HANAU, GERMANY, A CORPORATION OF GERMANY.

MANUFACTURE OF ARTIFICIAL-SILK THREADS FROM CELLULOSE.

1,066,785.      Specification of Letters Patent.      Patented July 8, 1913.

No Drawing.      Application filed August 14, 1912. Serial No. 715,117.

*To all whom it may concern:*

Be it known that I, ERNST BECHTEL, a subject of the Emperor of Germany, and resident of Hanau-on-the-Main, Germany, have invented certain new and useful Improvements in the Manufacture of Artificial-Silk Threads from Cellulose, of which the following is a specification.

This invention relates to improvements in the process for the manufacture and production of artificial silk threads from cellulose dissolved in ammoniacal cupric oxid, alkali caustic lye being employed as the precipitant.

It has been generally supposed that perfect threads of artificial silk of marketable value could only be obtained from cellulose dissolved in ammoniacal cupric oxid by means of alkali lye as precipitating liquor when the alkali lye was heated. I have now discovered that it is not necessary to heat the alkali lye for the production of perfectly fine silk threads, if the solution of cellulose in ammoniacal cupric oxid to be spun, be heated before it enters the setting bath, and the coagulation be carried out in this heated state. This new discovery is accounted for by the fact that a perfect precipitation of cellulose solutions with alkali lye depends essentially and solely on the ammonia contained in the solution being so liberated that it can readily escape from the solution, whether this solution issues out in warm or cold soda lye. The result, as before stated, has already been partly attained if hot lye be used, since the latter loosens the combination of the solution with the ammonia.

The heating of the solution of cellulose in the ammoniacal cupric oxid before entering the lye according to the present invention, which lye may be cold, has the great advantage over the employment of hot lye, that the heating can be effected in a very simple and uniform manner, whereas heating in the case of most precipitating liquors has never been carried out hitherto with the complete uniformity requisite for obtaining a perfectly uniform final product.

For the purpose of the preliminary heating, the solution, before entering the setting bath, is passed along in contact with a constant supply of heat, which may be either steam, heated air or any other regulated source of heat. Still better results are obtained when the solution is previously heated and is allowed to enter the lye which is also heated since in the latter case the dissociation of the solution is effected with greater rapidity and in consequence the speed of withdrawal of the spun thread can be considerably increased. If this double heating be employed the speed of withdrawal can be increased up to from 70 to 80 meters per minute.

What I claim is—

1. In the manufacture of threads of artificial silk from cellulose dissolved in ammoniacal cupric oxid, caustic alkali lye being used as the precipitant, the step of heating the solution of cellulose before its entrance into the setting bath.

2. In the manufacture of threads of artificial silk from cellulose dissolved in ammoniacal cupric oxid, caustic alkali lye being used as the precipitant, the step of heating the solution of cellulose as well as the setting bath into which the heated solution of cellulose is introduced.

In testimony whereof I have signed my name to this specification in the presence of two subscribing witnesses.

ERNST BECHTEL.

Witnesses:
    FRANZ HASSLACHER,
    JOSEF WESTHOFER.